United States Patent [19]

Katsuoka

[11] Patent Number: 4,457,552
[45] Date of Patent: Jul. 3, 1984

[54] FRONT COWLING FOR MOTORCYCLES WITH DEFLECTORS FOR HEATED AIR

[75] Inventor: Tatsuzo Katsuoka, Hamamatsu, Japan

[73] Assignee: Yamaha Hatausoki Kabushiki Kaisha, Iwata, Japan

[21] Appl. No.: 393,446

[22] Filed: Jun. 29, 1982

[30] Foreign Application Priority Data

Jul. 6, 1981 [JP] Japan .............................. 56-104491

[51] Int. Cl.³ .............................................. B62J 17/06
[52] U.S. Cl. ...................................... 296/78.1; 296/15
[58] Field of Search .................................. 296/78.1, 15

[56] References Cited

U.S. PATENT DOCUMENTS 4,130,315  12/1978  Shields ............................... 296/78.1

Primary Examiner—Robert R. Song
Attorney, Agent, or Firm—Donald D. Mon

[57] ABSTRACT

A front cowling for a motorcycle which extends from the front, where it has an aperture to admit engine-cowling air, and past to the sides of the engine to a location adjacent to the rider's legs. A side post is formed in the cowling at each side, just ahead of the rider's legs, and a respective baffle is mounted to the cowling so as selectively to close the side posts and permit flow of air to the legs that entered the aperture and was heated by the engine, or to open the side posts and deflect the heated air away from the legs and out the side posts. Thus, in cold weather, the rider's legs can be warmed by the heated air, and in hot weather his legs need not be warmed by the heated air.

1 Claim, 3 Drawing Figures

FRONT COWLING FOR MOTORCYCLES WITH DEFLECTORS FOR HEATED AIR

FIELD OF THE INVENTION

This invention relates to front cowlings for motorcycles, and in particular to such a cowling which covers the engine unit, and is adapted selectively to deflect heated air away from the legs of the rider.

BACKGROUND OF THE INVENTION

In the prior art, a motorcycle has its front covered with a front cowling so as to turn away the cold air flow from the rider or to reduce the air flow pressure upon the rider, thereby to reduce the running drag. Such a front cowling covers the engine, and is formed in front of the engine with a front opening so that it can introduce a cooling air flow to the engine.

In the front cowling for a motorcycle as it exists in the prior art, however, since the front cowling is extended to the vicinity of the legs of the rider, the air flow, which has been introduced from the front opening and heated by the engine, impinges upon the rider's legs thereby undesirably and uncomfortably to heat the legs of the rider when the motorcycle is run in hot or warm weather.

The present invention has been conceived to avoid this problem in the prior art, and has an object to provide a front cowling for a motorcycle, which can improve the rider's comfort.

BRIEF DESCRIPTION OF THE INVENTION

In order to achieve the above-identified object, according to the present invention there is provided a front cowling of a motorcycle for covering an engine unit, which cowling is characterized in that it is provided at both the sides thereof with a pair of flow-arranging baffles which are enabled to control the direction of air flow to the legs of the rider.

The present invention will described in the following in connection with one embodiment thereof with reference to the accompanying drawings, in which:

DETAILED DESCRIPTION OF THE INVENTION

Figure 1:
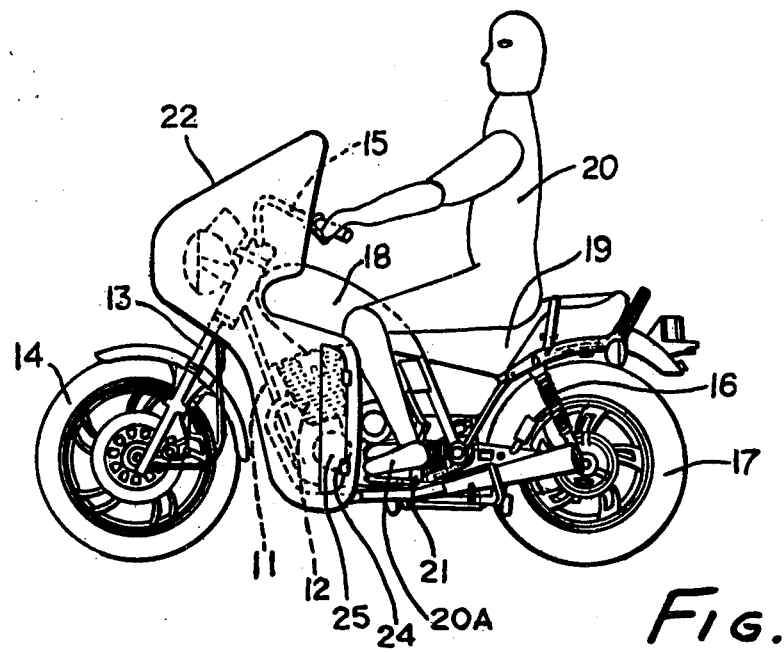
FIG. 1 is a side elevation showing one embodiment of a front cowling of a motorcycle according to the present invention.

An engine 12 is mounted on a frame 11. A front wheel 14 is suspended through a front fork 13 from the front portion of frame 11, and a steering handle 15 is disposed in the front portion of frame 11. A rear wheel 17 is suspended through a rear cushion 16 from the rear portion of frame 11. A fuel tank 18 and a seat 19 are mounted on the upper portion of frame 11 so that a rider 20 who seats himself upon the seat 19 can rest his legs 20A upon foot rests 21.

To the front of the frame, moreover, there is attached a front cowling 22 which has its upper portion covering steering handle 15 and its lower portion covering engine 12, extending to the vicinity of legs 20A of rider 20.

Figure 2:
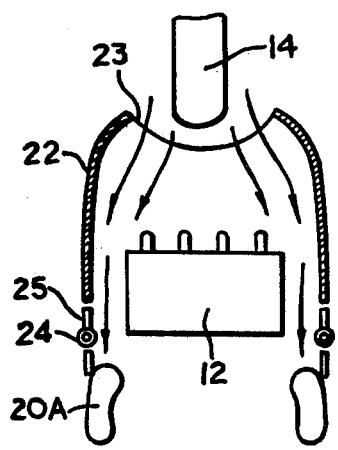
FIGS. 2 and 3 are sectional views schematically showing an essential portion of the same embodiment in different operating conditions, respectively.
Figure 3:
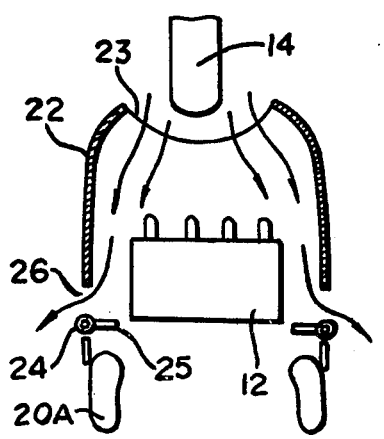

Front cowling 22 is formed in front of engine 12 with a front opening 23 which is enabled to introduce a cooling air flow to engine 12. At each of the side portions extending from front cowling 22 to legs 20A, there are arranged respective flow-arranging plates 25 which are hinged at 24. These flow-arranging plates 25 (sometimes called "baffles") can be swung between a closed position, as shown in FIG. 2, in which they are positioned inside ports 26 in the extensions of the body sides of the front cowling 22, and an open position, as shown in FIG. 3, in which they are positioned out of side ports 26 and in front of legs 20A of rider 20. Thus, the baffles can be selectively fixed at either of the aforementioned two positions thereby to control the direction of air flow relative to the legs 20A.

Next, the operations of the embodiment thus constructed will be described as follows. In cold or chill weather, baffles 25 are held in the closed position, as shown in FIG. 2, so that the hot air flow, which has been introduced from front opening 23 of front cowling 22 and heated by engine 12, flows to and impinges upon legs 20A of rider 20, thereby to protect the rider against the cold. In hot or warm weather, on the other hand, baffles 25 are held in the open position, as shown in FIG. 3, so that the hot air flow (heated by engine 21) is not introduced to the legs 20A but instead as arranged by the baffles, is turned away through side openings 26 to the outside, whereby the legs 20A are protected from the hot air.

According to the embodiment thus far described, the rider turns baffles 25 in accordance with the change in the weather to control the directions of the hot air flow, which has been heated by the engine 12, to or away from legs so that the riding comfort can be made excellent.

As has been described hereinbefore, according to the present invention, a front cowling of the motorcycle for covering the engine unit is provided at both of its sides with paired flow-arranging baffles which are enabled to control the direction of the air flow relative to the legs of the rider. As a result, the present invention can improve the rider's comfort.

This invention is not to be limited by the embodiment shown in the drawing and described in the description, which is given by way of example and not of limitation, but only in accordance with the scope of the appended claims.

I claim:

1. A front cowling for a motorcycle, said motorcycle including a frame having a forward direction, a seat for a rider so disposed and arranged that the rider's legs straddle the frame, with the lower portions of the legs below the knees disposed rearwardly of at least part of the engine, said cowling having side portions which extend rearwardly alongside at least a portion of said engine, and which cowling has an aperture ahead of the engine whereby air that enters the cowling is heated by the engine, a side port in each side of said cowling forwardly from said lower leg portion, and rearwardly from at least a portion of said engine and a baffle pivotally mounted to said cowling adjacent to each said port adapted to be moved to close said port whereby to cause heated air to impinge on said lower portions of said legs, or to open said ports whereby to deflect said heated air away from said lower portions of said legs and out said ports.

* * * * *